(12) United States Patent
Taguchi et al.

(10) Patent No.: US 11,214,396 B2
(45) Date of Patent: Jan. 4, 2022

(54) INSPECTION DEVICE, PTP PACKAGING MACHINE AND PTP SHEET MANUFACTURING METHOD

(71) Applicant: CKD CORPORATION, Aichi (JP)

(72) Inventors: Yukihiro Taguchi, Aichi (JP); Tsuyoshi Ohyama, Aichi (JP); Norihiko Sakaida, Aichi (JP)

(73) Assignee: CKD CORPORATION, Aichi (JP)

( * ) Notice: Subject to any disclaimer, the term of this patent is extended or adjusted under 35 U.S.C. 154(b) by 181 days.

(21) Appl. No.: 16/655,348

(22) Filed: Oct. 17, 2019

(65) Prior Publication Data

US 2020/0047934 A1 Feb. 13, 2020

Related U.S. Application Data

(63) Continuation of application No. PCT/JP2017/037648, filed on Oct. 18, 2017.

(30) Foreign Application Priority Data

Apr. 18, 2017 (JP) .............................. JP2017-081936

(51) Int. Cl.
*B65B 57/10* (2006.01)
*B65B 47/04* (2006.01)
(Continued)

(52) U.S. Cl.
CPC .............. *B65B 57/10* (2013.01); *B65B 9/045* (2013.01); *B65B 47/04* (2013.01); *G01N 21/27* (2013.01); *G01N 21/359* (2013.01)

(58) Field of Classification Search
None
See application file for complete search history.

(56) References Cited

U.S. PATENT DOCUMENTS 7,812,948 B2 * 10/2010 Honda ................. G01N 21/359
356/326
8,963,089 B2 * 2/2015 Sakai ................... G01N 21/359
250/339.07

(Continued)

FOREIGN PATENT DOCUMENTS

| JP | 2014-215177 A | 11/2014 |
| WO | 2005/038443 A1 | 4/2005 |
| WO | 2013/002291 A1 | 1/2013 |

OTHER PUBLICATIONS

International Preliminary Report on Patentability issued in corresponding International Patent Application No. PCT/JP2017/037648, dated Oct. 31, 2019 (14 pages).

(Continued)

*Primary Examiner* — Hemant Desai
*Assistant Examiner* — Tanzim Imam
(74) *Attorney, Agent, or Firm* — Osha Bergman Watanabe & Burton LLP

(57) ABSTRACT

An inspection device includes: an irradiator that irradiates an object with near-infrared light; a spectroscope that disperses reflected light from the irradiated object; an imaging device that takes a spectroscopic image of the reflected light; a processor that: obtains spectral data of a plurality of points on the object, based on the spectroscopic image; defines a group of similar spectral data from among the spectral data of the plurality of points; extracts a group having a largest number of spectral data from the defined group; calculates an average of the spectral data of the extracted group; and detects a type of the object using a predetermined analysis of the object, based on the average.

2 Claims, 10 Drawing Sheets

(51) Int. Cl.
*B65B 9/04* (2006.01)
*G01N 21/27* (2006.01)
*G01N 21/359* (2014.01)

(56) References Cited

U.S. PATENT DOCUMENTS

| | | | | |
|---|---|---|---|---|
| 8,969,806 B2* | 3/2015 | Fukuma | ............. | G01N 21/3563 |
| | | | | 250/339.07 |
| 2002/0108892 A1* | 8/2002 | Goetz | ................. | G01N 21/274 |
| | | | | 209/576 |
| 2013/0278919 A1* | 10/2013 | Kawamura | ............ | G01N 21/31 |
| | | | | 356/51 |
| 2014/0319351 A1* | 10/2014 | Yamada | ............. | G01N 21/8901 |
| | | | | 250/339.02 |
| 2016/0114925 A1* | 4/2016 | Yuyama | ................... | G06K 9/46 |
| | | | | 382/141 |

OTHER PUBLICATIONS

International Search Report issued in corresponding International Application No. PCT/JP2017/037648, dated Jan. 16, 2018 (3 pages).

\* cited by examiner

INSPECTION DEVICE, PTP PACKAGING MACHINE AND PTP SHEET MANUFACTURING METHOD

BACKGROUND

Technical Field

The present invention relates to an inspection device configured to inspect for inclusion of any different type of object by taking advantage of spectral analysis, a Press Through Package (PTP) packaging machine, and a PTP sheet manufacturing method.

Description of Related Art

A PTP sheet is generally comprised of a container film that has pocket portions filled with objects, such as tablets, and a cover film that is mounted to the container film such as to seal openings of the pocket portions.

In a process of manufacturing the PTP sheet, a different type inclusion inspection is performed to inspect for inclusion of any different type of object. A known technique for this inspection irradiates an object with near-infrared light, disperses reflected light from the object by a spectral unit and performs an analysis process (for example, principal component analysis) based on spectral data obtained by taking an image of the dispersed reflected light, so as to detect inclusion of any different type of object.

A known procedure of performing the analysis process based on spectral data averages spectral data at a plurality of points on each object to calculate average spectral data with regard to the object and determines the type of the object based on the average spectral data (as described in, for example, Patent Literature 1).

Another known procedure detects a center position of each object, averages spectral data at a plurality of points near to the center position to calculate average spectral data with regard to the object and determines the type of the object based on the average spectral data (as described in, for example, Patent Literature 2).

PATENT LITERATURE

Patent Literature 1: WO 2013-002291A
Patent Literature 2: WO 2005/038443A

The technique of simply averaging spectral data in a predetermined area on an object like the prior arts described in Patent Literatures 1 and 2 described above may, however, fail to provide appropriate average spectral data with regard to the object.

The object is, for example, a tablet (uncoated tablet) formed by mixing various active ingredients, a diluent base and the like and compacting the mixture. In this case, there may be a significant variation of data among coordinate points on one identical tablet, due to the microscopic non-uniformity of the tablet and the effects of a cleavage line and the unevenness of the surface. This may cause a failure to provide the uniformity.

More specifically, as shown in FIG. 11 and FIG. 12, in the case where a lump area R1 of a diluent base is present on the tablet 5, a procedure of simply averaging spectral data with regard to coordinate points A to G or a procedure of averaging spectral data with regard to coordinate points C to E included in a nearby area R2 close to the center position of the tablet 5 may be affected by spectral data with regard to the lump area R1 of the diluent base and may fail to provide appropriate average spectral data.

Especially it may be difficult to accurately differentiate a different type of tablet having similar spectral data, for example, a different type of tablet having different contents of active ingredients. As a result, this significantly reduces the inspection accuracy in the different type inclusion inspection.

SUMMARY

One or more embodiments of the present invention provide an inspection device configured to improve the inspection accuracy relating to a different type inclusion inspection that takes advantage of spectral analysis, as well as a PTP packaging machine and a PTP sheet manufacturing method.

The following describes functions and advantageous effects of one or more embodiments.

According to one or more embodiments, there is provided an inspection device comprising an irradiation unit configurated to irradiate an object with near-infrared light; a spectral unit configured to disperse reflected light that is reflected from the object irradiated with the near-infrared light; an imaging unit configured to take a spectroscopic image of the reflected light dispersed by the spectral unit; a spectral data obtaining unit configured to obtain spectral data with regard to a plurality of points (a plurality of coordinate positions) on the object, based on the spectroscopic image taken by the imaging unit; a grouping unit configured to group the spectral data with regard to the plurality of points and thereby provide a group of similar spectral data; a group extraction unit configured to extract a group having a largest number of spectral data included in the group, out of the provided one or more groups; an average spectrum calculation unit configured to use (entire or partial) spectral data included in the group extracted by the group extraction unit to calculate average spectral data of the object; and an analysis unit configured to detect a different type of object by performing a predetermined analysis process (for example, principal component analysis) with regard to the object, based on the average spectral data.

The inspection device of one or more embodiments described above enables the average spectral data of the object to be obtained after exclusion of spectral data (singular values) with regard to singular points on one object. Even when there is a variation in data among coordinate points on one object, this configuration obtains appropriate average spectral data with regard to the object. As a result, this configuration improves the inspection accuracy in different type inclusion inspection.

In the process of "grouping the spectral data with regard to the plurality of points and thereby providing groups of similar spectral data", "a similarity determination process (similarity determination unit) is performed (provided) to determine whether the spectral data with regard to the plurality of points are similar to each other". For example, as the similarity determination process (similarity determination unit), a procedure (a unit) may be employed to determine that the spectral data with regard to the plurality of points are similar to each other when a difference in luminance value (spectral intensity) or a ratio of the difference therebetween is equal to or smaller than a predetermined value over an entire wavelength range (or at a specific wavelength or over a specific wavelength range) of the spectral data. This procedure is, however, not essential, but another procedure may be employed for the similarity determination. For example, a simpler procedure may be employed to determine whether peak wavelengths of a plurality of spectral data are identical with each other and determine that the plurality of spectral data are similar to each other when they are identical.

According to one or more embodiments, there is provided a PTP packaging machine configured to manufacture a PTP sheet, such that an object is contained in a pocket portion formed in a container film and that a cover film is mounted to the container film, so as to close the pocket portion. The PTP packaging machine comprises a pocket portion forming unit configured to form the pocket portion in the container film that is conveyed in a belt-like manner; a filling unit configured to fill the object into the pocket portion; a mounting unit configured to mount the cover film in a belt-like shape to the container film with the pocket portion filled with the object, so as to close the pocket portions; a separation unit (including a punching unit configured to punch out in a unit of sheets) configured to separate the PTP sheet from a belt-like body (belt-like PTP film) obtained by mounting the cover film to the container film; and the inspection device of one or more embodiments.

According to one or more embodiments, the PTP packaging machine is provided with the inspection device according to one or more embodiments. This configuration has, for example, an advantage of efficiently excluding defective products that include different types of objects, in a manufacturing process of the PTP sheet. The PTP packaging machine may further be provided with a discharge unit configured to discharge any PTP sheet determined as defective by the above inspection device.

According to a modification of one or more embodiments, the inspection device may be placed in "a previous process before the object is filled into the pocket portion by the filling unit". This configuration enables a different type of object to be excluded in a stage prior to filling the object into the pocket portion and reduces the number of PTP sheets that are specified as defective products.

According to another modification, the inspection device may be placed in "a post process after the object is filled into the pocket portion by the filling unit and a previous process before the cover film is mounted by the mounting unit". This configuration enables an inspection to be performed in the state that the object is not concealed and thereby further improves the inspection accuracy.

According to another modification, the inspection device may be placed in "a post process after the cover film is mounted by the mounting unit and a previous process before the PTP sheet is separated by the separation unit". This configuration enables an inspection to be performed in the state that the object is not replaceable and thereby further improves the inspection accuracy.

According to another modification, the inspection device may be placed in "a post process after the PTP sheet is separated by the separation unit". This configuration allows for a check to determine whether any defective product is included in a final stage.

According to one or more embodiments, there is provided a PTP sheet manufacturing method performed to manufacture a PTP sheet, such that an object is contained in a pocket portion formed in a container film and that a cover film is mounted to the container film, so as to close the pocket portion. The PTP sheet manufacturing method comprises a pocket portion forming process of forming the pocket portion in the container film that is conveyed in a belt-like manner; a filling process of filling the object into the pocket portion; a mounting process of mounting the cover film in a belt-like shape to the container film with the pocket portion filled with the object, so as to close the pocket portions; a separation process (including a punching process of punching out in a unit of sheets) of separating the PTP sheet from a belt-like body (belt-like PTP film) obtained by mounting the cover film to the container film; and an inspection process of inspecting for inclusion of a different type of object. The inspection process comprises an irradiation process of irradiating the object with near-infrared light; a dispersion process of dispersing reflected light that is reflected from the object irradiated with the near-infrared light; an imaging process (exposure process) of taking a spectroscopic image of the dispersed reflected light; a spectral data obtaining process of obtaining spectral data with regard to a plurality of points on the object, based on the spectroscopic image; a grouping process of grouping the spectral data with regard to the plurality of points and thereby providing a group of similar spectral data; a group extraction process of extracting a group having a largest number of spectral data included in the group, out of the provided one or more groups; an average spectrum calculation process of using (entire or partial) spectral data included in the extracted group to calculate average spectral data of the object; and an analysis process of detecting a different type of object by performing a predetermined analysis process (for example, principal component analysis) with regard to the object, based on the average spectral data.

The configuration of one or more embodiments has similar functions and advantageous effects to those of the embodiments described above. According to a modification of one or more embodiments, the inspection process may be performed in "a previous process before the filling process". This configuration enables a different type of object to be excluded in a stage prior to filling the object into the pocket portion and reduces the number of PTP sheets that are specified as defective products.

According to another modification, the inspection process may be performed in "a post process after the filling process and a previous process before the mounting process". This configuration enables an inspection to be performed in the state that the object is not concealed and thereby further improves the inspection accuracy.

According to another modification, the inspection process may be performed in "a post process after the mounting process and a previous process before the separation process". This configuration enables an inspection to be performed in the state that the object is not replaceable and thereby further improves the inspection accuracy.

According to another modification, the inspection process may be performed in "a post process after the separation process". This configuration allows for a check to determine whether any defective product is included in a final stage.

DETAILED DESCRIPTION

The following describes embodiments with reference to drawings. The configuration of a PTP sheet is described first in detail.

Figure 1A:
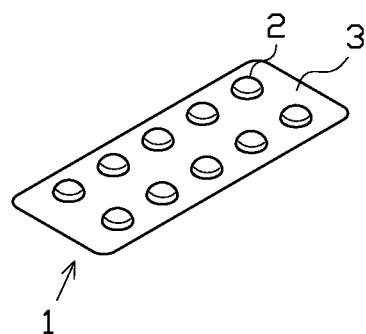
FIG. 1A is a perspective view illustrating a PTP sheet according to one or more embodiments and FIG. 1B is a perspective view illustrating a PTP film according to one or more embodiments.
Figure 1B:
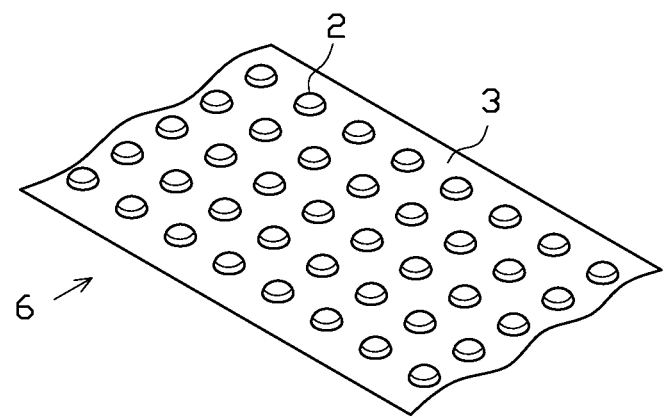
Figure 2:
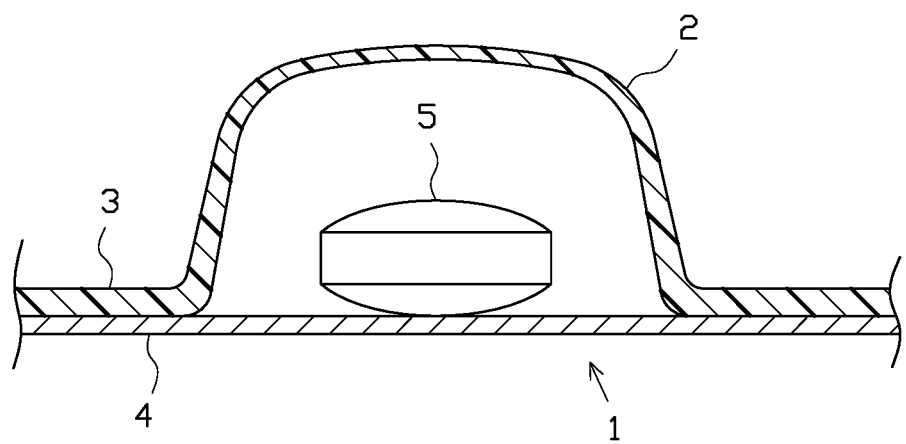
FIG. 2 is a partly enlarged sectional view illustrating a pocket portion of the PTP sheet according to one or more embodiments.

As shown in FIG. 1A, FIG. 1B, and FIG. 2, a PTP sheet 1 includes a container film 3 provided with a plurality of pocket portions 2, and a cover film 4 mounted to the container film 3 such as to close the respective pocket portions 2. One tablet 5 is placed as an object in each of the pocket portions 2.

The container film 3 according to one or more embodiments is made of a transparent or translucent thermoplastic resin material, such as PP (polypropylene) or PVC (polyvinyl chloride) and has translucency. The cover film 4 is, on the other hand, made of aluminum.

The PTP sheet 1 (shown in FIG. 1A) is manufactured by punching sheets from a belt-like PTP film 6 (shown in FIG. 1B) that is comprised of the belt-like container film 3 and the belt-like cover film 4.

The following describes the general configuration of a PTP packaging machine 10 used to manufacture the PTP sheet 1 described above, with reference to FIG. 3.

Figure 3:
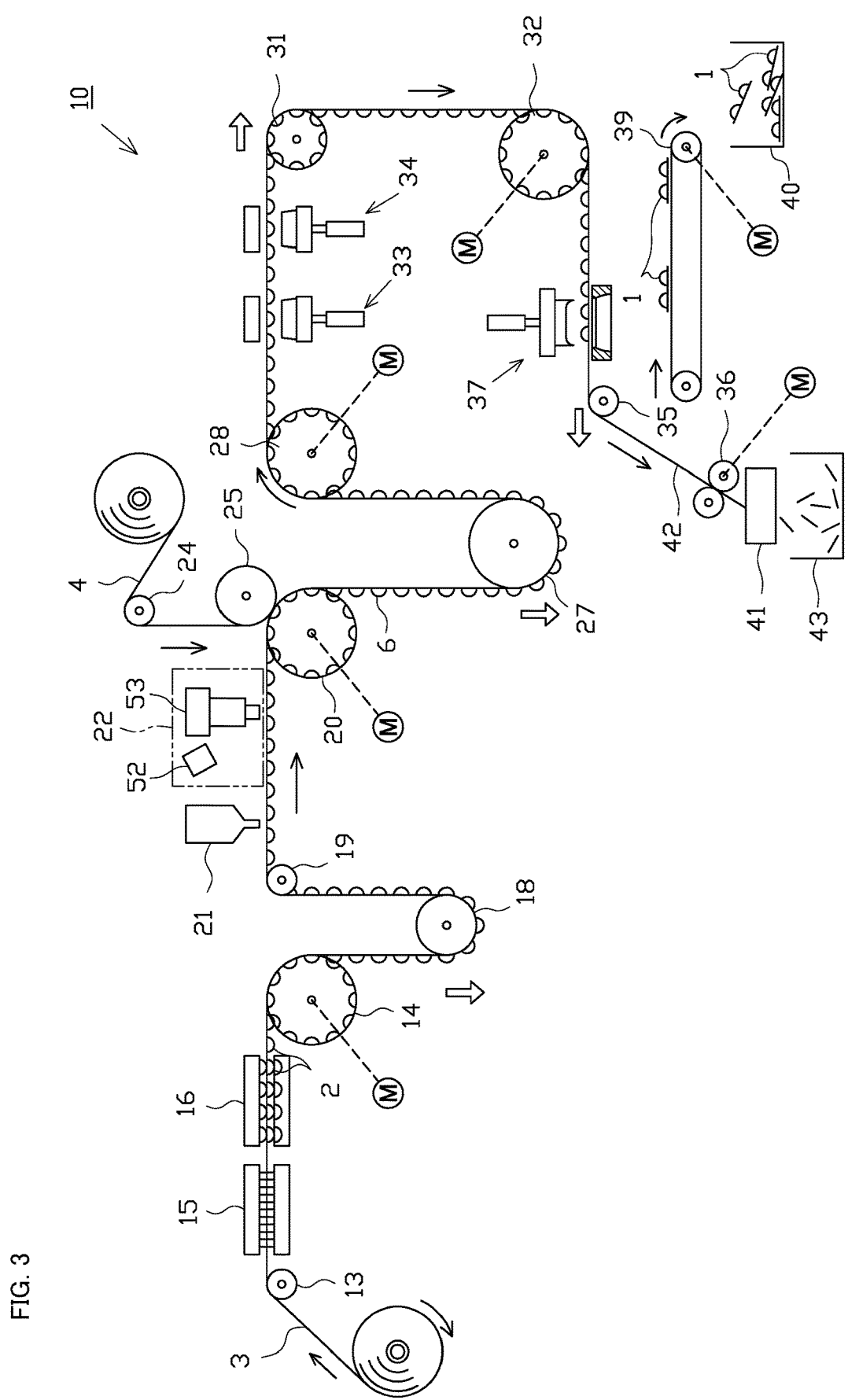
FIG. 3 is a diagram illustrating the schematic configuration of a PTP packaging machine according to one or more embodiments.

As shown in FIG. 3, a film roll of the belt-like container film 3 is wound in a roll form on a most upstream side of the PTP packaging machine 10. A pullout end of the container film 3 wound in the roll form is guided by a guide roll 13. The container film 3 is then laid on an intermittent feed roll 14 provided on a downstream side of the guide roll 13. The intermittent feed roll 14 is coupled with a motor rotating in an intermittent manner, so as to convey the container film 3 intermittently.

A heating device 15 and a pocket portion forming device 16 are sequentially placed along the conveyance path of the container film 3 between the guide roll 13 and the intermittent feed roll 14. In the state that the container film 3 is heated to be relatively soft by the heating device 15, the plurality of pocket portions 2 are formed at predetermined positions of the container film 3 by the pocket portion forming device 16 (pocket portion forming process). The heating device 15 and the pocket portion forming device 16 provide the pocket portion forming unit (pocket portion former) according to one or more embodiments. Formation of the pocket portions 2 is performed during an interval between conveying operations of the container film 3 by the intermittent feed roll 14.

The container film 3 fed from the intermittent feed roll 14 is sequentially laid on a tension roll 18, a guide roll 19 and a film receiving roll 20 in this order. The film receiving roll 20 is coupled with a motor rotating at a fixed speed, so as to continuously convey the container film 3 at a fixed speed. The tension roll 18 is configured to pull the container film 3 in a direction of applying tension by an elastic force. This configuration prevents a slack of the container film 3 due to a difference between the conveying operation by the intermittent feed roll 14 and the conveying operation by the film receiving roll 20 and constantly keeps the container film 3 in the state of tension.

A tablet filling device 21 is placed along the conveyance path of the container film 3 between the guide roll 19 and the film receiving roll 20. The tablet filling device 21 serves as the filling unit (filler) to automatically fill the tablets 5 into the pocket portions 2. The tablet filling device 21 opens a shutter at every predetermined time interval to drop the tablet 5, in synchronism with the conveying operation of the container film 3 by the film receiving roll 20. Each of the pocket portions 2 is filled with the tablet 5 by this shutter opening operation (filling process).

An inspection device 22 is placed along the conveyance path of the container film 3 between the tablet filling device 21 and the film receiving roll 20. The inspection device 22 is an inspection device configured to perform an inspection by taking advantage of spectral analysis and more specifically inspect for inclusion of any different type of object. The details of the inspection device 22 will be described later.

A film roll of the belt-like cover film 4 is also wound on a roll form and is placed on a most upstream side.

A pullout end of the cover film 4 wound in the roll form is guided by a guide roll 24 to a heating roll 25. The heating roll 25 is pressed against to be in contact with the film receiving roll 20 described above. The container film 3 and the cover film 4 are accordingly fed into between the two rolls 20 and 25.

The container film 3 and the cover film 4 pass through between the two rolls 20 and 25 in the heated and pressed contact state, so that the cover film 4 is mounted to the container film 3 such as to close the respective pocket portions 2 (mounting process). This series of operations provides the belt-like PTP film 6 manufactured such that the tablet 5 is filled in each of the pocket portions 2. The heating roll 25 has minute protrusions formed on the surface of the heating roll 25 in a net-like pattern for sealing. Strongly pressing these protrusions against the films provides secure sealing. The film receiving roll 20 and the heating roll 25 provide the mounting unit (mounter) according to one or more embodiments.

The PTP film 6 fed from the film receiving roll 20 is sequentially laid on a tension roll 27 and an intermittent feed roll 28 in this order. The intermittent feed roll 28 is coupled with a motor rotating in an intermittent manner, so as to convey the PTP film 6 intermittently. The tension roll 27 is configured to pull the PTP film 6 in a direction of applying tension by an elastic force. This configuration prevents a slack of the PTP film 6 due to a difference between the conveying operation by the film receiving roll 20 and the conveying operation by the intermittent feed roll 28 and constantly keeps the PTP film 6 in the state of tension.

The PTP film 6 fed from the intermittent feed roll 28 is sequentially laid on a tension roll 31 and an intermittent feed roll 32 in this order. The intermittent feed roll 32 is coupled with a motor rotating in an intermittent manner, so as to convey the PTP film 6 intermittently. The tension roll 31 is configured to pull the PTP film 6 in a direction of applying tension by an elastic force and thereby serves to prevent a slack of the PTP film 6 between these intermittent feed rolls 28 and 32.

A slit formation device 33 and a stamping device 34 are sequentially placed along the conveyance path of the PTP film 6 between the intermittent feed roll 28 and the tension roll 31. The slit formation device 33 serves to form a cutting slit at predetermined positions of the PTP film 6. The stamping device 34 serves to stamp a mark at predetermined positions of the PTP film 6 (for example, in tag portions).

The PTP film 6 fed from the intermittent feed roll 32 is sequentially laid on a tension roll 35 and a continuous feed roll 36 in this order on a downstream side of the intermittent feed roll 32. A sheet punching device 37 is placed along the conveyance path of the PTP film 6 between the intermittent feed roll 32 and the tension roll 35. The sheet punching device 37 serves as a sheet punching unit (separation unit, separator) to punch out the outer periphery of each portion of the PTP film 6 in the unit of PTP sheet 1.

The respective PTP sheets 1 punched out by the sheet punching device 37 are conveyed by an extraction conveyor 39 and are temporarily accumulated in a finished product hopper 40 (separation process). When a PTP sheet 1 is determined as a defective product by the inspection device 22 described above, this PTP sheet 1 determined as defective is separately discharged by a non-illustrated defective sheet discharge mechanism serving as the discharge unit.

A cutting device 41 is provided on a downstream side of the continuous feed roll 36. An unrequired film portion 42 that is a residual part (scrap part) remaining in a belt-like form after punching out by the sheet punching device 37 is guided by the tension roll 35 and the continuous feed roll 36 and is subsequently led to the cutting device 41. A driven roll is pressed against to be in contact with the continuous feed roll 36, so that the unrequired film portion 42 is placed and conveyed between the driven roll and the continuous feed roll 36. The cutting device 41 serves to cut the unrequired film portion 42 into predetermined dimensions as scraps. These scraps are accumulated in a scrap hopper 43 and are disposed separately.

Each of the rolls, for example, the rolls 14, 20, 28, 31 and 32 described above is arranged such that the roll surface is opposed to the pocket portions 2. The surface of each roll, for example, the surface of the intermittent feed roll 14, has recesses that are formed to place the pocket portions 2 therein. This configuration suppresses the pocket portions 2 from being crushed. The feeding operation with the pocket portions 2 placed in the recesses of each roll, for example, the intermittent feed roll 14, achieves the reliable intermittent feed and continuous feed.

Figure 4:
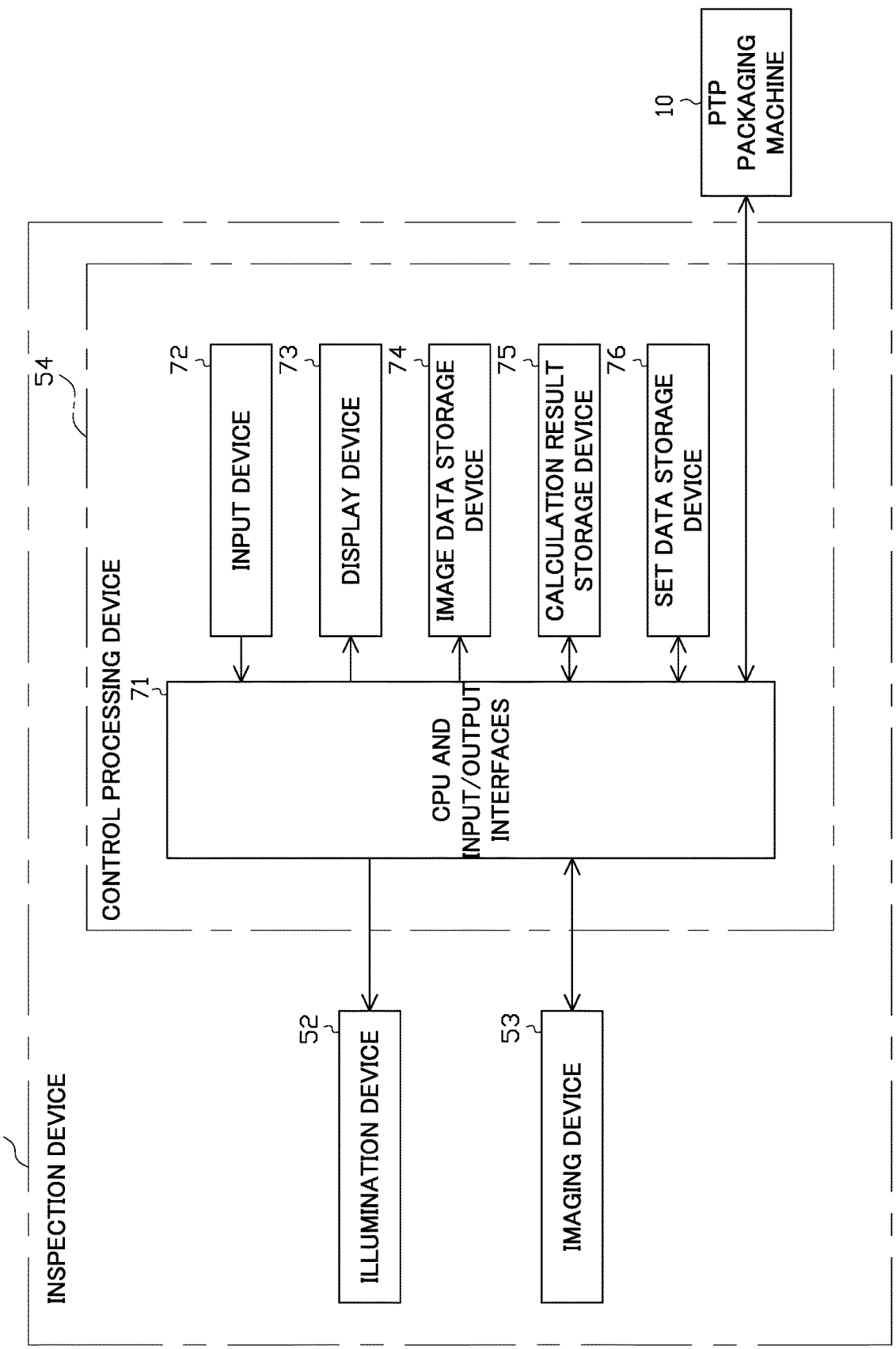
FIG. 4 is a block diagram illustrating the electrical configuration of an inspection device according to one or more embodiments.
Figure 5:
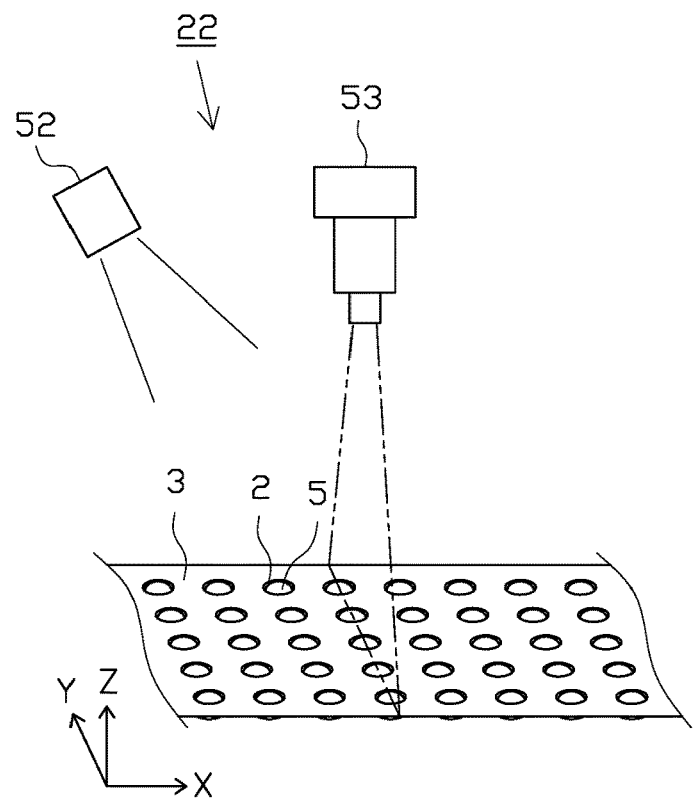
FIG. 5 is a perspective view schematically illustrating the arrangement configuration of the inspection device according to one or more embodiments.

The foregoing describes the outline of the PTP packaging machine 10. The following describes the configuration of the above inspection device 22 in detail with reference to drawings. FIG. 4 is a block diagram illustrating the electrical configuration of the inspection device 22. FIG. 5 is a perspective view schematically illustrating the arrangement configuration of the inspection device 22.

As shown in FIG. 4 and FIG. 5, the inspection device 22 includes an illumination device 52, an imaging device 53, and a control processing device 54 configured to perform various controls in the inspection device 22, for example, drive controls of the illumination device 52 and the imaging device 53, image processing, arithmetic operations and the like.

The illumination device 52 and the imaging device 53 are placed on an opening side of the pocket portions 2 of the container film 3. More specifically, according to one or more embodiments, an inspection for inclusion of any different type of object is performed from the opening side of the pocket portions 2 of the container film 3 in a stage prior to mounting of the cover film 4.

The illumination device 52 has a known configuration to radiate near-infrared light and provides the irradiation unit (irradiator) according to one or more embodiments. The illumination device 52 is arranged to irradiate a predetermined area on the continuously fed container film 3 obliquely downward with near-infrared light.

According to one or more embodiments, a halogen lamp is employed for the illumination device 52 as a light source configured to emit near-infrared light having a continuous spectrum (for example, a near infrared range having a wavelength of 700 to 2500 nm). Other examples usable as the light source include a deuterium lamp, a tungsten lamp, and a xenon lamp.

Figure 6:
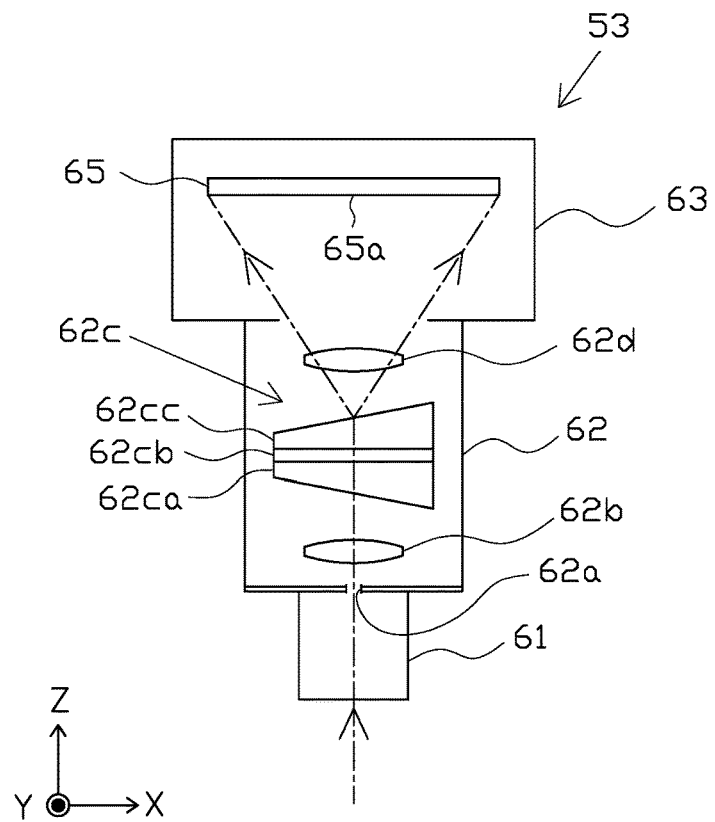
FIG. 6 is a diagram illustrating the schematic configuration of an imaging device according to one or more embodiments.

As shown in FIG. 6, the imaging device 53 includes an optical lens assembly 61, a two-dimensional spectroscope 62 serving as the spectral unit (spectroscope), and a camera 63 serving as the imaging unit (imaging device).

The optical lens assembly 61 is comprised of a plurality of non-illustrated lenses and the like and is configured to convert incident light into parallel light. The optical lens assembly 61 has an optical axis that is set along a vertical direction (Z direction).

The optical lens assembly 61 is set to focus the incident light at the position of a slit 62a of the two-dimensional spectroscope 62 described later. As a matter of convenience, the following describes an example of employing a double-sided telecentric lens for the optical lens assembly 61. An image-sided telecentric lens is, however, also naturally employable for the optical lens assembly 61.

The two-dimensional spectroscope 62 is configured to include a slit 62a, an incident-side lens 62b, a spectral portion 62c and an emission-side lens 62d. The spectral portion 62c is configured to include an incident-side prism 62ca, a transmission type diffraction grating 62cb, and an emission-side prism 62cc.

Under the configuration described above, the light passing through the slit 62a is converted into parallel light by the incident-side lens 62b, is dispersed by the spectral portion 62c, and is focused by the emission-side lens 62d on an imaging element 65 of the camera 63 described later as a two-dimensional spectroscopic image (optical spectrum).

The slit 62a is formed to have a long approximately rectangular (linear) opening and is provided such that a width direction (short side direction) thereof is arranged along a film conveying direction of the container film 3 (X direction) and that a longitudinal direction thereof is arranged along a film width direction of the container film 3 (Y direction) that is orthogonal to the conveying direction. Accordingly, the two-dimensional spectroscope 62 serves to disperse the incident light in the width direction of the slit 62a, i.e., in the film conveying direction (X direction).

The camera 63 includes an imaging element 65 having a light receiving surface 65a where a plurality of light receiving elements are two-dimensionally arranged. According to one or more embodiments, a CCD area sensor having sufficient sensitivity to, for example, a wavelength range of 900 to 1700 nm, out of the near infrared range, is employed as the imaging element 65. The imaging element is, however, necessarily not limited to this example, but another sensor having sensitivity to the near infrared range is also employable as the imaging element. For example, a CMOS sensor or an MCT (HgCdTe) sensor may be employed as the imaging element.

The imaging device 53 has a field of vision that is a linear region extended along the film width direction (Y direction) and that is a region including at least the entire film width direction of the container film 3 (as shown by a two-dot chain line portion in FIG. 5). The field of vision of the imaging device 53 in the film conveying direction (X direction) is, on the other hand, a region corresponding to the width of the slit 62a. In other words, the field of vision is a region where an image of the light passing through the slit 62a (slit light) is formed on the light receiving surface 65a of the imaging element 65.

Dispersed light (light of each wavelength) of reflected light that is reflected at each position in the film width direction (Y direction) of the container film 3 is received by each of the light receiving elements of the imaging element 65. A signal corresponding to the intensity of the light received by each of the light receiving elements is then output to the control processing device 54.

The control processing device 54 includes a CPU and input/output interfaces 71 (hereinafter referred to as "CPU and the like 71") that is configured to control the entire inspection device 22, an input device 72 that is configured as the "input unit" by, for example, a keyboard and a mouse or by a touch panel, a display device 73 that is configured as the "display unit" including a display screen such as a CRT screen or a liquid crystal screen, an image data storage device 74 that is configured to store various image data and the like, a calculation result storage device 75 that is configured to store results of various arithmetic operations and the like, and a set data storage device 76 that is configured to store various pieces of information in advance. These devices 72 to 76 are electrically connected with the CPU and the like 71.

The CPU and the like 71 is connected with the PTP packaging machine 10 such as to send and receive various signals to and from the PTP packaging machine 10. This configuration enables the CPU and the like 71 to control, for example, the defective sheet discharge mechanism of the PTP packaging machine 10.

The image data storage device 74 is configured to store, for example, spectroscopic image data taken by the imaging device 53, spectral image data obtained on the basis of the spectroscopic image data, binarized image data after a binarization process, and differential image data after differential processing.

The calculation result storage device 75 is configured to store, for example, inspection result data and statistical data obtained by statistically processing the inspection result data. These inspection result data and statistical data may be displayed appropriately on the display device 73.

The set data storage device 76 is configured to store, for example, a loading vector and a determination range used for principal component analysis, as well as the shapes and the dimensions of the PTP sheet 1, the pocket portion 2 and the tablet 5.

The following describes a procedure of different type inclusion inspection (inspection process) performed by the inspection device 22.

Figure 7:
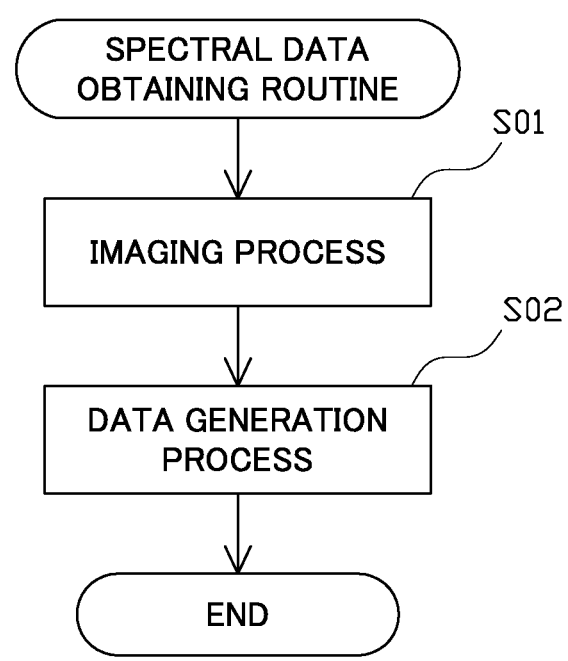
FIG. 7 is a flowchart showing a spectral data obtaining routine according to one or more embodiments.

A spectral data obtaining routine performed to obtain spectral data is described first with reference to the flowchart of FIG. 7. This routine is performed repeatedly every time a predetermined amount of the container film 3 is conveyed.

At step S01, the control processing device 54 first causes the imaging device 53 to perform an imaging process (exposure process), while irradiating the continuously conveyed container film 3 (tablet 5) with near-infrared light emitted from the illumination device 52 (irradiation process).

The control processing device 54 drives and controls the imaging device 53 in response to a signal input from a non-illustrated encoder provided in the PTP packaging machine 10, and stores spectroscopic image data taken by the imaging device 53 into the image data storage device 74.

Accordingly, reflected light that is reflected in a conveying direction imaging range W (shown in FIG. 9), out of the near-infrared light emitted from the illumination device 52 toward the container film 3, during an execution period of the imaging process of step S01 (exposure period) enters the imaging device 53. In other words, an image of the conveying direction imaging range W is taken by one imaging process.

The reflected light entering the imaging device 53 is dispersed by the two-dimensional spectroscope 62 (dispersion process) and is taken in the form of a spectroscopic image (optical spectrum) by the imaging element 65 of the camera 63.

The spectroscopic image data taken by the imaging device 53 is output to the control processing device 54 during an interval period and is stored into the image data storage device 74. The interval period herein denotes a reading period of image data. Accordingly, an imaging cycle of the imaging device 54 is expressed by a total time of the exposure period that is the execution period of the imaging process and the interval period.

When obtaining the spectroscopic image data, the control processing device 54 starts a data generation process at step S02.

The data generation process generates spectral data, based on the spectroscopic image data obtained at step S01. After generation of the spectral data, the control processing device 54 stores the generated spectral data into the image data storage device 74 and then terminates this routine.

Figure 9:
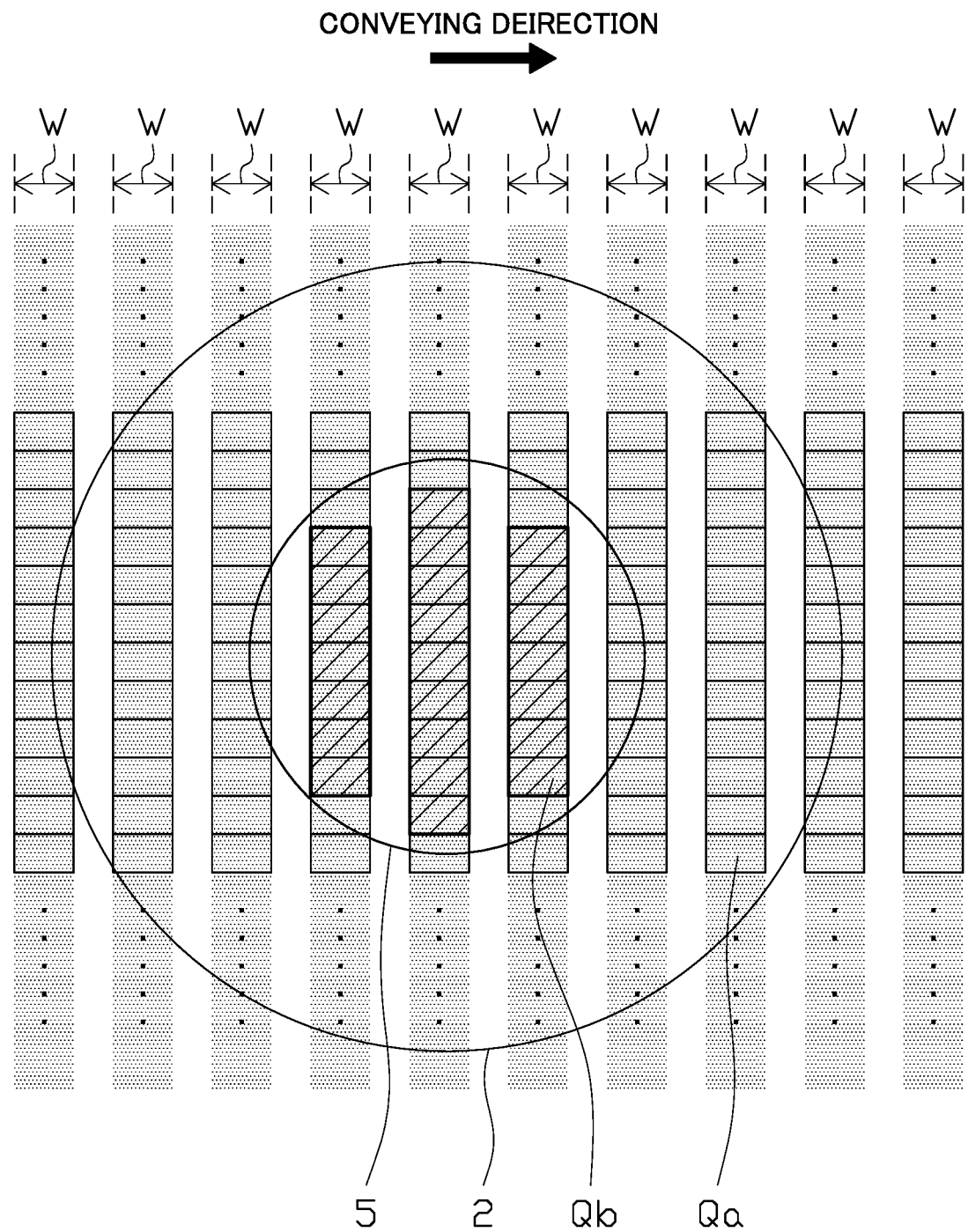
FIG. 9 is a diagram illustrating a relationship between a conveying direction imaging range and a spectral image according to one or more embodiments.
Figure 10:
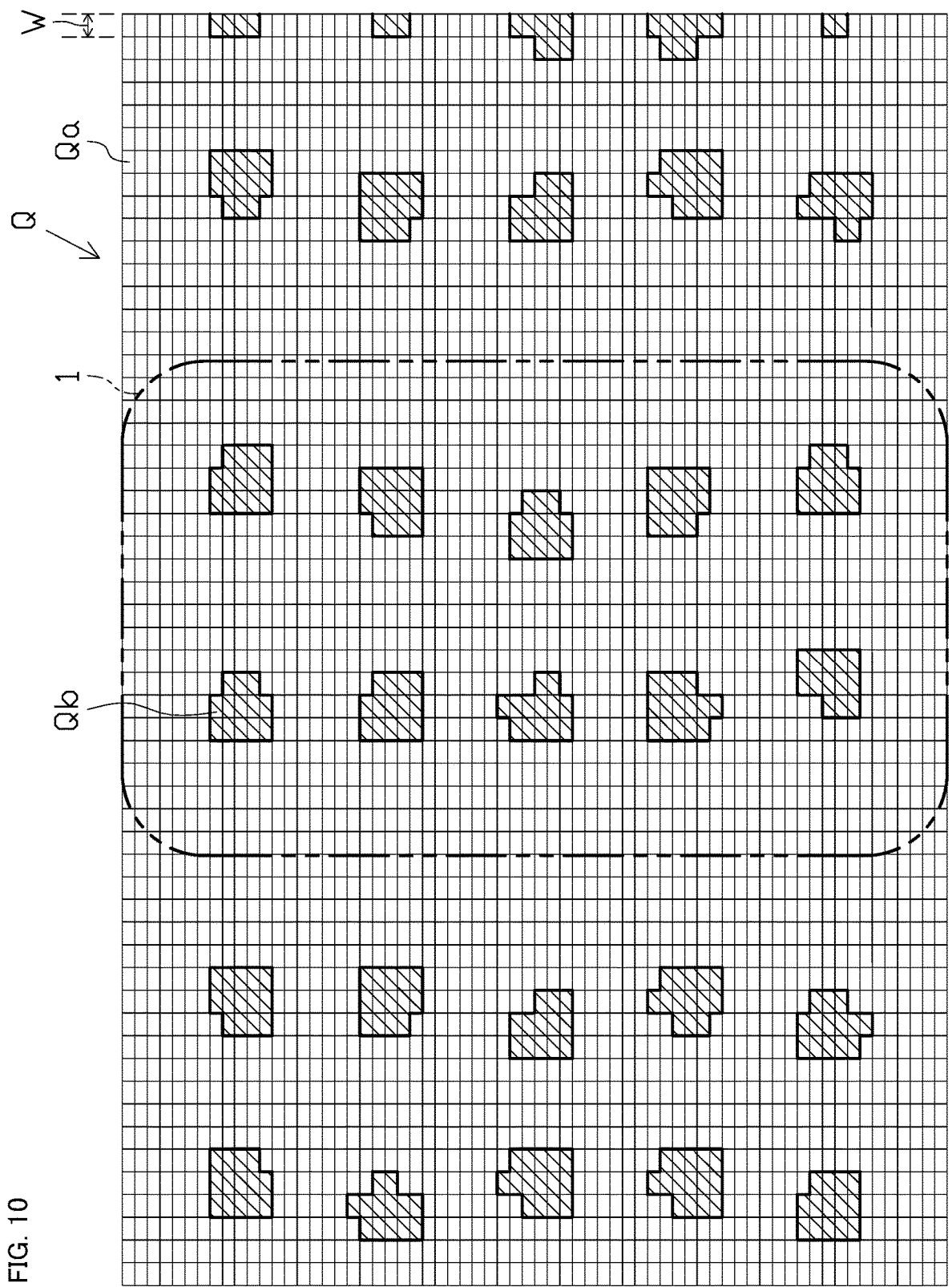
FIG. 10 is a diagram illustrating a spectral image according to one or more embodiments.

As shown in FIG. 9, every time a predetermined amount of the container film 3 (tablet 5) is conveyed, the conveying direction imaging range W is relatively moved intermittently and the spectral data obtaining routine described above is performed repeatedly. This causes spectral data corresponding to the respective conveying direction imaging ranges W to be successively stored into the image data storage device 74 in time series along with position information in the film conveying direction (X direction) and in the film width direction (Y direction). This series of operations generate a two-dimensional spectral image Q having spectral data with regard to each pixel (as shown in FIG. 10).

The following describes the spectral image Q according to one or more embodiments. As shown in FIG. 10, the spectral image Q is image data including a plurality of pixels Qa arrayed two-dimensionally. Each of the pixels Qa includes spectral data (data indicating spectral intensities (luminance values) at a plurality of wavelengths or in a wavelength band).

When obtaining the spectral image Q in a range corresponding to one PTP sheet 1 as an inspection object (as shown by a two-dot chain line portion in FIG. 10), the control processing device 54 performs an inspection routine.

Figure 8:
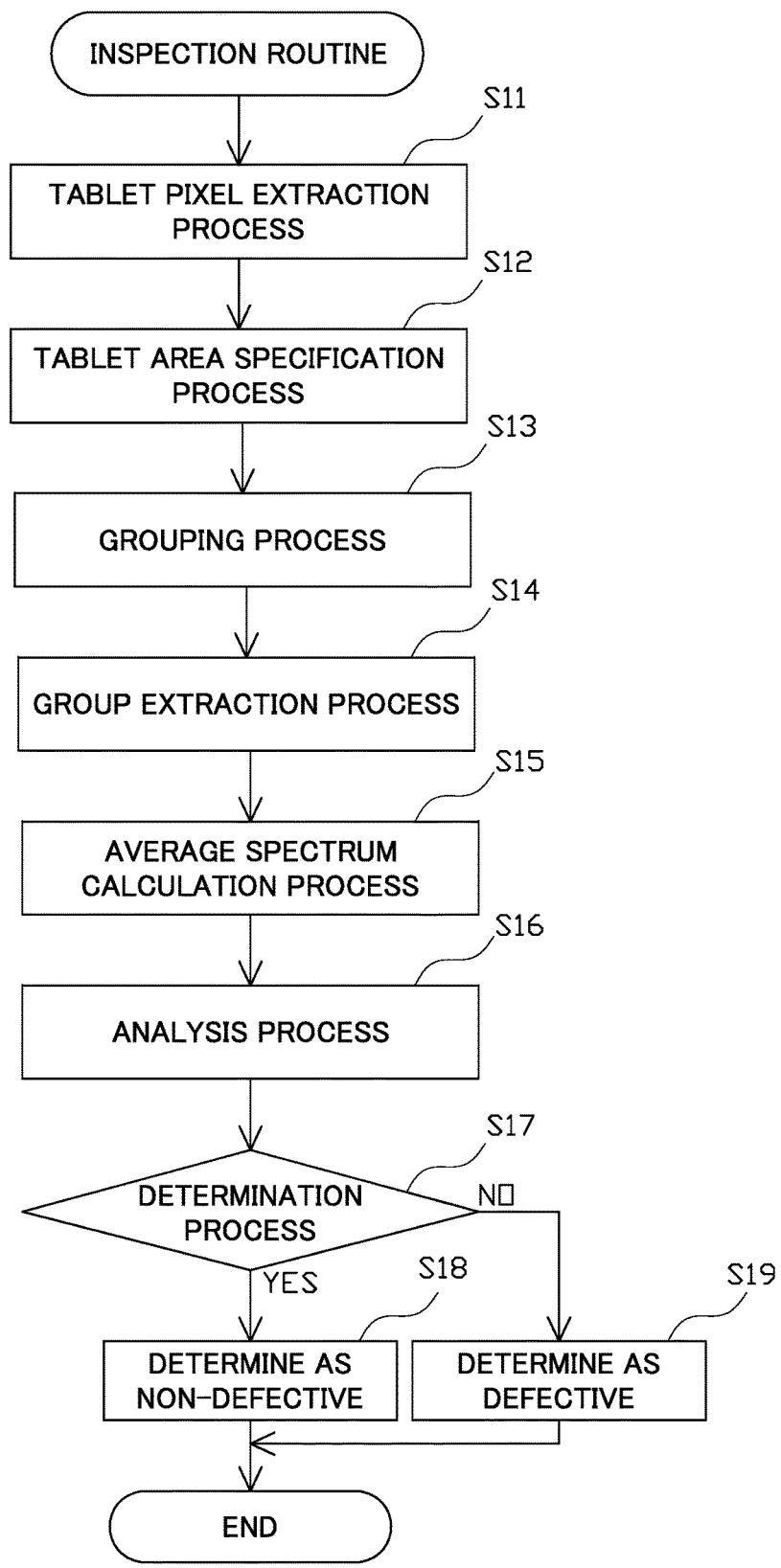
FIG. 8 is a flowchart showing an inspection routine according to one or more embodiments.

The following describes the inspection routine with reference to the flowchart of FIG. 8. The inspection routine is performed repeatedly every time the spectral image Q in a range corresponding to one PTP sheet 1 is obtained.

The control processing device 54 first performs a tablet pixel extraction process at step S11. This tablet pixel extraction process extracts pixels (tablet pixels) Qb corresponding to the tablet 5 among the respective pixels Qa of the spectral image Q.

According to one or more embodiments, for example, the control processing device 54 determines whether the spectral intensity (luminance value) at a predetermined wavelength in the spectral data of each pixel Qa is equal to or greater than a predetermined reference value and processes the spectral image Q by a binarization process. The control processing device 54 then extracts the tablet pixels Qb, based on the obtained binarized image data (as shown in FIG. 9 and FIG. 10).

According to one or more embodiments, as shown in FIG. 9, pixels Qa including data of imaging only the range of the tablet 5 without being affected by background are extracted as tablet pixels Qb. FIG. 9 is a diagram illustrating a relationship between the conveying direction imaging range W and the spectral image Q. Pixels extracted as the tablet pixels Qb are given as hatched areas in FIGS. 9 and 10.

The method of extracting the tablet pixels Qb is, however, not limited to this method, but another method may be employed to extract the tablet pixels Qb. For example, another employable method may calculate an integrated value of spectral data with regard to each of the pixels Qa and determine whether the calculated integrated value is equal to or greater than a predetermined reference value, so as to extract the tablet pixels Qb.

At subsequent step S12, the control processing device 54 performs a tablet area specification process. This tablet area specification process specifies the area of each tablet 5.

According to one or more embodiments, for example, the control processing device 54 performs a labeling process with regard to the tablet pixels Qb extracted at step S11 described above and regards all adjacent tablet pixels Qb as a linkage component of the tablet pixels Qb corresponding to one identical tablet 5.

This specifies the range of one linkage component as a tablet area with regard to one tablet 5 (as shown in FIG. 9 and FIG. 10). The linkage component (tablet area) of the plurality of tablet pixels Qb corresponding to each tablet 5 are encircled by a thick frame in FIG. 9 and FIG. 10.

The spectral data of the plurality of tablet pixels Qb included in one linkage component (tablet area) can be treated as spectral data at a plurality of points (plurality of coordinate positions) on one tablet 5.

According to one or more embodiments, the spectral data obtaining process is thus configured by a series of processes, for example, the data generation process of step S02, the tablet pixel extraction process of step S11 and the tablet area specification process of step S12 described above. According to one or more embodiments, the spectral data obtaining unit is configured by the functions of the control processing device 54 that performs the spectral data obtaining process.

The method of specifying the area of the tablet 5 is, however, not limited to this method, but another method may be employed to specify the area of the tablet 5. For example, another employable method may specify pixels included in a predetermined range about a specific pixel, as pixels corresponding to one identical tablet 5 that is identical with the tablet 5 corresponding to the specific pixel.

The control processing device 54 subsequently performs a grouping process at step S13. This grouping process corresponds to the grouping process according to one or more embodiments. According to one or more embodiments, the grouping unit is configured by the functions of the control processing device 54 that performs this grouping process.

The grouping process is performed with regard to each tablet area of each tablet 5 specified at step S12 described above to group spectral data of the plurality of tablet pixels Qb included in the tablet area and thereby provide respective groups of similar spectral data.

The grouping process first performs a similarity determination process to determine whether spectral data of the plurality of tablet pixels Qb are similar to each other (similarity determination process). According to one or more embodiments, the similarity determination unit is configured by the functions of the control processing device 54 that performs this similarity determination process.

According to one or more embodiments, for example, a plurality of spectral data is determined to be similar to each other when a difference in the luminance value (spectral intensity) or a ratio of the difference therebetween is equal to or smaller than a predetermined value over an entire wavelength range (or at a specific wavelength or over a specific wavelength range) of the spectral data. This procedure is, however, not essential, but another procedure may be employed for the similarity determination. For example, a simpler procedure may be employed to determine whether peak wavelengths of a plurality of spectral data are identical with each other and determine that the plurality of spectral data are similar to each other when they are identical.

Figure 11:
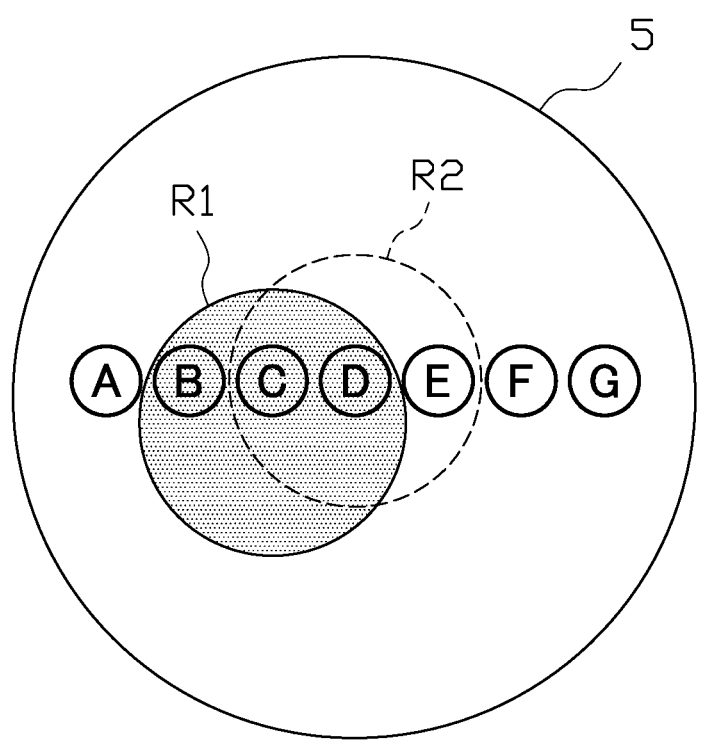
FIG. 11 is a diagram illustrating one example of a plurality of coordinate points on a tablet to obtain spectral data according to one or more embodiments.
Figure 12:
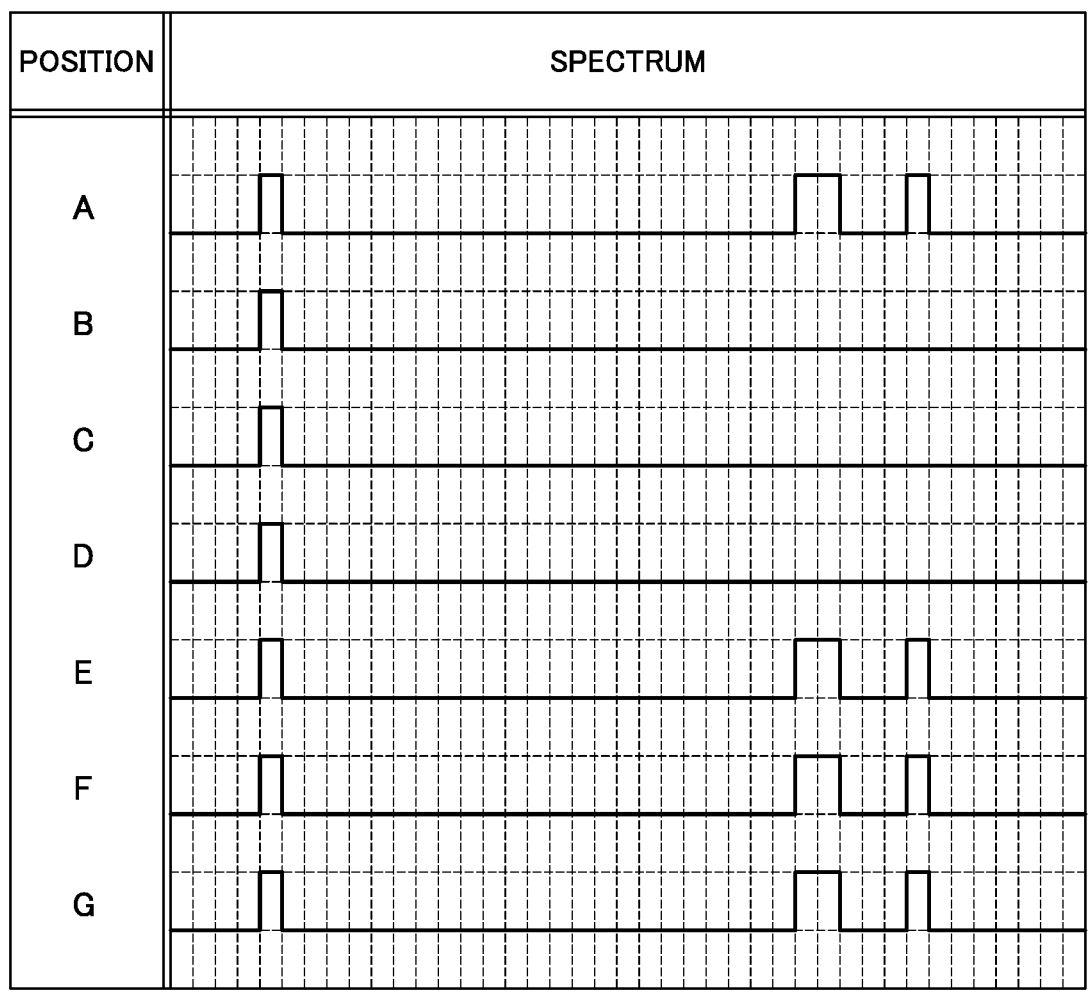
FIG. 12 is a diagram illustrating one example of spectral data obtained at a plurality of coordinate points on a tablet according to one or more embodiments.

The following describes an arrangement of the grouping process involved in step S13 with reference to FIG. 11 and FIG. 12. FIG. 11 is a diagram illustrating one example of a plurality of coordinate points on one tablet 5 to obtain spectral data. FIG. 12 is a diagram illustrating one example of spectral data obtained at these coordinate points (data after the binarization process).

As shown in FIG. 11, when spectral data are obtained with regard to a plurality of coordinate points A to G on one tablet 5, the grouping process first performs the similarity determination of the spectral data with regard to the coordinate points A to G. The grouping process then groups the spectral data with regard to the coordinate points A to G and thereby provides or defines respective groups of similar spectral data.

In the illustrated example of FIG. 12, spectral data with regard to the coordinate points A, E, F and G are similar to one another, and spectral data with regard to the coordinate points B, C and D are similar to one another. The grouping process accordingly groups the spectral data to provide a first similarity group including the spectral data with regard to the coordinate points A, E, F and G and a second similarity group including the spectral data with regard to the coordinate points B, C and D.

The control processing device 54 subsequently performs a group extraction process at step S14. This group extraction process corresponds to the group extraction process according to one or more embodiments. According to one or more embodiments, the group extraction unit is configured by the functions of the control processing device 54 that performs this group extraction process.

The group extraction process is performed with regard to each tablet area of each tablet 5 to extract a group having the largest number of spectral data (coordinate points) included in the group, out of one or more groups that are provided by the grouping process at step S13. For example, in the illustrated example of FIGS. 11 and 12, the first similarity group including the spectral data with regard to the coordinate points A, E, F and G is extracted.

The control processing device 54 then performs an average spectrum calculation process at step S15. This average spectrum calculation process corresponds to the average spectrum calculation process according to one or more embodiments. According to one or more embodiments, the average spectrum calculation unit is configured by the functions of the control processing device 54 that performs this average spectrum calculation process.

With regard to each tablet area of each tablet 5, the average spectrum calculation process uses spectral data of a plurality of tablet pixels Qb included in the group extracted at step S14 described above to calculate average spectral data (average) of the tablet 5.

According to one or more embodiments, the average spectrum calculation process averages all the spectral data of the plurality of tablet pixels Qb included in the extracted group and provides this averaging result as the average spectral data of the tablet 5. This procedure is, however, not essential, but another procedure may be employed to average spectral data of partial tablet pixels Qb out of the plurality of tablet pixels Qb included in the extracted group and provide this averaging result as the average spectral data of the tablet 5.

The control processing device 54 subsequently performs an analysis process at step S16. This analysis process corresponds to the analysis process according to one or more embodiments. According to one or more embodiments, the analysis unit is configured by the function of the control processing device 54 that performs this analysis process.

According to one or more embodiments, the control processing device 54 uses a loading vector obtained in advance and performs principal component analysis (PCA) with regard to the average spectral data of each tablet 5 calculated at step S15. More specifically, the control processing device 54 calculates a principal component point by arithmetic operation of the loading vector and the average spectral data of each tablet 5.

The control processing device 54 subsequently performs a determination process of determining whether the tablet 5 as the object is a non-defective product (identical type of object) or a defective product (different type of object) at step S17. More specifically, the control processing device 54 plots the principal component point calculated at step S16 described above in a PCA chart and determines the tablet 5 as a non-defective product (identical type of object) when the plotted data is within a non-defective range set in advance, while determining the tablet 5 as a defective product (different type of object) when the plotted data is out of the non-defective range.

The series of processing involved in step S17 described above is performed for each of all the tablets on the PTP sheet 1. When there is no tablet 5 determined as "defective", the control processing device 54 determines the PTP sheet 1 as a non-defective product (step S18) and then terminates this routine. When there is any tablet 5 determined as "defective", on the other hand, the control processing device 54 determines the PTP sheet 1 as a defective product (step S19) and then terminates this routine. The result of this inspection is output to the display device 73 and to the PTP packaging machine 10 (including the defective sheet discharge mechanism).

As described above in detail, the configuration of one or more embodiments obtains the average spectral data of the tablet 5 after exclusion of spectral data (singular values) with regard to singular points on one tablet 5.

For example, as shown in FIG. 11, even when a lump area R1 of a diluent base is present on the tablet 5, this configuration of one or more embodiments enables appropriate average spectral data of the tablet 5 to be obtained without being affected by spectral data with regard to the lump area R1 of the diluent base (spectral data with regard to the coordinate points B to D included in the lump area R1), compared with the known configuration of simply averaging the spectral data with regard to the coordinate points A to G or the known configuration of averaging spectral data with regard to coordinate points C to E included in a nearby area R2 close to the position of the center of the tablet 5.

As a result, the configuration of one or more embodiments improves the inspection accuracy in different type inclusion inspection.

The present invention is not limited to the description of the above embodiments but may be implemented, for example, by configurations described below. The present invention may also be naturally implemented by applications and modifications other than those illustrated below.

(a) According to embodiments described above, the object is the tablet 5. The type, the shape and the like of the object are, however, not specifically limited. For example, the object may be a capsule, a supplement, or a food item. The tablet includes a solid preparation such as an uncoated tablet and a sugar-coated tablet.

(b) According to embodiments described above, the container film 3 is made of the transparent or translucent thermoplastic resin material such as PP, and the cover film 4 is made of aluminum. The materials of the respective films 3 and 4 are, however, not limited to these materials but may be other materials.

For example, the container film 3 may be made of a metal material that includes aluminum as a main material, for example, aluminum laminated film.

(c) The arrangement and the number of the pocket portions 2 in the PTP sheet 1 are not limited at all to those described in the above embodiments. A PTP sheet may be configured to have any of various other arrangements of and any number of pocket portions, for example, a total of twelve pocket portions arrayed in three lines.

(d) According to one or more embodiments described above, the inspection device 22 is configured to perform the different type inclusion inspection in a post process after the tablets 5 are filled in the pocket portions 2 and a previous process before the cover film 4 is mounted to the container film 3.

This configuration is, however, not essential. According to a modification, the inspection device 22 may be configured to perform the different type inclusion inspection from the container film 3-side of the PTP film 6 in a post process after the cover film 4 is mounted to the container film 3 and a previous process before the PTP sheets 1 are punched out from the PTP film 6.

According to another modification, the inspection device 22 may be configured to perform the different type inclusion inspection from the container film 3-side of the PTP sheet 1 conveyed by the extraction conveyor 39 in a post process after the PTP sheets 1 are punched out from the PTP film 6.

According to another modification, instead of the (inline) configuration where the inspection device 22 is provided in the PTP packaging machine 10, the inspection device 22 may be provided as a device of performing an offline inspection of the PTP sheet 1, separately from the PTP packaging machine 10. Additionally, the inspection device 22 may be equipped with a conveyance unit to convey the PTP sheet 1.

According to another modification, the inspection device 22 may be configured to perform the different type inclusion inspection in a previous process before the tablets 5 are filled in the pocket portions 2. For example, the inspection may be performed in a stage before the tablets 5 are fed into the tablet filling device 21. In other words, the inspection device 22 may be provided as a device of performing an offline inspection of the tablets 5, separately from the PTP packaging machine 10.

(e) The configurations of the illumination device 52 and the imaging device 53 are not limited to those described in the above embodiments. For example, a reflection type diffraction grating, a prism and the like may be employed as the spectral unit, in place of the two-dimensional spectroscope 62.

(f) According to one or more embodiments described above, the spectral data are analyzed by principal component analysis (PCA). This method is, however, not essential. Another known method, such as PLS regression analysis may be employed to analyze the spectral data.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . PTP sheet, 2 . . . pocket portion, 3 . . . container film, 4 . . . cover film, 5 . . . tablet, 10 . . . PTP packaging machine, 22 . . . inspection device, 52 . . . illumination device, 53 . . . imaging device, 54 . . . control processing device, 62 . . . two-dimensional spectroscope, 62a . . . slit, 63 . . . camera, Q . . . spectral image, Qa . . . pixels, Qb . . . pixels corresponding to tablet

The invention claimed is:

1. An inspection device comprising:
an irradiator that irradiates an object with near-infrared light;
a spectroscope that disperses reflected light from the irradiated object;
an imaging device that takes a spectroscopic image of the dispersed light; and
a processor that:
obtains spectral data of a plurality of points on the object, based on the spectroscopic image;
defines groups of similar spectral data from among the spectral data of the plurality of points;
extracts a group having a largest number of spectral data from the defined groups;
calculates an average of the spectral data of the extracted group; and
detects a type of the object using a predetermined analysis of the object, based on the average.

2. A Press Through Package (PTP) packaging machine that manufactures a PTP sheet,
the PTP packaging machine comprising:
a pocket portion former that forms a pocket portion in a container film that is conveyed in a belt-like manner;
a filler that fills an object into the pocket portion;
a mounter that mounts a cover film onto the container film to close the pocket portion;
a separator that separates the PTP sheet from a belt-like body obtained by mounting the cover film to the container film; and
the inspection device according to claim 1.

* * * * *